United States Patent [19]

Hrabal

[11] Patent Number: 4,869,289

[45] Date of Patent: Sep. 26, 1989

[54] ADJUSTABLE COMPRESSOR VALVE WHICH CAN ACCOMMODATE CHANGING OPERATING CONDITIONS IN THE COMPRESSOR TO WHICH IT IS ATTACHED

[75] Inventor: Hans Hrabal, Vienna, Austria

[73] Assignee: Hoerbiger Ventilwerke Aktiengesellschaft, Vienna, Austria

[21] Appl. No.: 254,229

[22] Filed: Oct. 6, 1988

Related U.S. Application Data

[62] Division of Ser. No. 35,927, Apr. 8, 1987, Pat. No. 4,799,507.

[51] Int. Cl.$^4$ .............................. F16K 15/08
[52] U.S. Cl. .................. 137/512.1; 137/516.19; 137/529; 417/298
[58] Field of Search ........... 137/512.1, 516.11–516.23, 137/529; 417/297, 298

[56] References Cited

U.S. PATENT DOCUMENTS 2,903,334  10/1959  Sochting ..................... 417/298 X
3,820,561  6/1974  Papst .

FOREIGN PATENT DOCUMENTS 185017  3/1956  Austria ..................... 137/516.23
317403  8/1974  Austria .
1042172  10/1958  Fed. Rep. of Germany ...... 417/297

Primary Examiner—Robert G. Nilson
Attorney, Agent, or Firm—Watson, Cole, Grindle & Watson

[57] ABSTRACT

To adapt a compressor valve to varying operational conditions of the compressor, particularly to varying numbers of revolutions and/or the respective specific weight of the transported gas, a process and a compressor valve for executing the process are provided. The process is that a compressor drive at various numbers of revolutions or transporting gas with varying specific weight, the spring force—possibly resulting from several spring forces—acting during operation on the plug in a closing direction and/or the lift of the plug is forcefully reduced with falling number of revolutions or increasing specific weight the process is reversed either continuously or in steps. In the compressor valve at least some of the closing springs are braced against a spring plate which is arranged on the outside of the catch in the lift direction of the plug, adjustable either continuously or in steps, or it is the catch itself which is continuously or in steps adjustable in the lift direction of the plug, relative to the valve seat.

6 Claims, 3 Drawing Sheets

ADJUSTABLE COMPRESSOR VALVE WHICH CAN ACCOMMODATE CHANGING OPERATING CONDITIONS IN THE COMPRESSOR TO WHICH IT IS ATTACHED

This application is a division of application Ser. No. 035,927, filed Apr. 18, 1987, now Pat. No. 4,799,507.

BACKGROUND OF THE INVENTION

1. Field of the Invention

The present invention relates to a compressor valve used on compressors, and in particular to a compressor valve which includes a valve seat having flow channels therethrough, a catch positioned at a distance from the valve seat, and a spring-loaded plug which moves between the valve seat and the catch to control the flow of gaseous medium through the valve.

2. The Prior Art

As is well known, independently operating compressor valves on compressors for a gaseous medium are controlled by the flow of the gaseous medium therethrough, i.e., the spring-loaded plug is lifted off the valve seat to allow the gaseous medium to flow through the valve by the force of the flowing gaseous medium. On the other hand, the springs acting on the spring-loaded plug make sure that the plug will move to close the valve when a gaseous medium is not flowing therethrough (pressureless condition). They also dampen the impact of the plug against the lift stop when the plug is moved away from the valve seat and they initiate the timely movement of the plug back towards the valve seat (closing motion).

The force of the gaseous medium on the plug will be determined to a large extent on the rotational speed of the compressor and on the specific weight of the gaseous medium. With a constant cross section of flow channels through the valve, the flow rate of gaseous medium and the force acting on the plug will increase with increasing rotational speed of the compressor. The force of the gaseous medium on the plug will also increase with an increase in the specific weight of the gaseous medium. In order to achieve a proper operation of the compressor valve, the spring pressure acting on the plug has to be selected with regard to the force from the flowing gaseous medium, and thus the rotational speed of the compressor and the specific gas weight. In this regard, if the spring force is too low, given the rotational speed of the compressor and/or the specific weight of the gaseous medium, the opening motion of the plug will not be sufficiently dampened and the closing motion will be initiated too late, thus causing hard impacts on the lift stop and the valve seat. On the other hand, if the spring force is too high, the valve will open too late and the plug will flutter, i.e., because the current force of the gaseous medium will not be sufficient to keep the plug securely positioned against the lift stop. Of course, if the compressor is driven at a constant rotational speed and if the flowing gaseous medium has a constant specific weight, the required spring force can be calculated and provided for. However, if during operation the rotational speed of the compressor varies, or if during operation the specific weight of the flowing gaseous medium changes, special measures may be needed to adapt the valve to these changing operational conditions.

In Austrian Patent 317,403 a valve is disclosed which includes two plugs for controlling the flow through the flow channels in the valve seat, one being arranged above the other. The plug which sits directly on the valve seat has openings which are covered by the second plug thereabove. In addition, separate lift stops are provided for the two plugs, these two lift stops being located at different distances from the valve seat. The upper plug which covers the openings of the other plug is under a greater spring force than the lower plug which contacts the valve seat. When the valve is opened, both plugs are simultaneously lifted off the valve seat. When the compressor is operated at a high rotational speed, thus producing a high current force of the gaseous medium, both plugs are moved against their respective lift stops and are held there without fluttering. When the compressor is operated at a low rotational speed, the two plugs are simultaneously lifted to only the closer lift stop and do not become separated. As such, this valve provides only a limited adaptation to varying rotational speeds of the compressor.

It is an object of the present invention to provide a compressor valve which can adapt to varying operational conditions of the compressor to which it is connected, in particular to its rotational speed and the specific weight of the medium being transported therethrough.

SUMMARY OF THE INVENTION

According to the present invention the compressor valve is constructed so that the spring force acting on the plug of the compressor valve can be adjusted, either continuously or in a stepwise fashion, to accommodate changes in the rotational speed of the compressor to which it is attached and/or changes in the specific weight of the fluid medium being transported through the compressor. The invention also relates to a method of controlling the operation of such compressor valves so as to accommodate such changes in the rotational speed of the compressor and/or the changes in the specific weight of the fluid medium being transported therethrough.

In one embodiment, the compressor valve includes a transmission device which includes fingers which act on the plug (a lift-off gripper), the force of the transmission device on the plug in a closing direction is always occurring. It is possible to use a valve construction wherein the transmission device holds the valve open for a period of time, although not so as to keep the plug away from the valve seat (the open condition of the valve) by force. As such, the opening force exerted by the transmission device on the plug cannot be greater than the spring force acting on the plug in a closing direction. However, in the known lift-off regulators the force exerted by the lift-off gripper in the plug is always greater than the force of the closing springs, as otherwise keeping the plug in an open position against the current forces would not be possible.

The compressor valve can include springs acting on the plug in the closing direction, at least some of the closing springs being braced through openings in the catch against a spring plate which is arranged on the outside of the catch in the lift direction of the plug, and are adjustable either continuously or in steps. In this manner the springs can be tensed or released as desired so that the required spring force is obtained. Since as a rule the adjustment is only needed within a limited range, it is sufficient if only some of the springs are constructed in an adjustable manner. If there are damper plates with their own damper springs, those too, or some of them, can also be braced against the adjustable spring plate.

In another embodiment of the compressor valve according to the invention the compressor valve can include a catch which is itself adjustable continuously or in steps in the lift direction of the plug relative to the valve seat. With this arrangement, the lift which is executed by the plug can be adjusted to the respective numbers of revolutions of the compressor or the respective specific weight of the gas. If the closing springs are braced against the catch, the spring path of the closing springs is, however, also changed by the adjustment of the catch as well as the force exerted by them onto the plug of the valve in the closed position. However, in compressor valves the spring force exerted with an open plug is relevant as the main duty for the closing spring is the damping of the impact by the plug against the catch and the initiating of a timely closing motion. For this reason it is possible to execute an optimal adapting of the compressor valve to variable operational conditions of the compressor by a simple adjustment of the catch.

The compressor valves can be constructed in various ways with an adjustable spring plate for the closing springs or with an adjustable catch. It is, for example, possible to use a guide bolt connected to the valve seat and extending in the lift direction of the plug, on which the catch and/or at least one spring plate for bracing closing springs is shiftably mounted, preferably against the force of a pull-back spring. The catch and the spring plate are thus securely led during the adjustment motion, without an excessively costly constructive effort being necessary. As only a limited adjustment motion is needed, suitable end stops are provided which prevent a too great adjustment.

In a preferred embodiment of the compressor valve according to the invention, the catch is shiftably mounted on a guide bolt with the aid of a guide sleeve centrally arranged in the valve axis, which is fitted at one end with a screw thread and has, at the other end, an enlarged head, by means of which it braces the plug and possibly other plate parts of the valve, such as damping plates, spring plates, guide plates, etc., against the catch, possibly with the aid of a graduated guide ring. This design with a single shiftable sleeve in the center of the valve is simple to execute and can easily be adjusted to the respective style of the valve.

Finally, the compressor valve can include a transfer device which is adjustable in the lift direction of the plug and which rests with fingers against the plug. An actually known valve design with lift-off grips can be used, as it has been known for a long time for the adjustment of the transport amounts of condensers. The transfer device can also be designed in addition to and in combination with measures for the adjustment of the spring force or the lift of the plug.

The measures according to the invention can be applied to the suction valve as well as the pressure valve of the compressor. It is suitable, but not obligatory, to provide installations for operating the adjustment of the spring force or the valve lift on the side of the built-in valve removed from the compressor, i.e., in the suction valve on the side of the valve seat and in the pressure valve on the side of the catch. However, and in particular in the suction valve, the adjustment device can extend through the valve seat and act on the catch or a spring plate provided on it. To seal towards the compressor it is possible to add in this embodiment an additional cover hood which encloses the catch and is clamped along its edge together with the valve seat.

If a transfer device of the type of a lift-off grip is used, either alone or jointly with other adjustment devices for the adjustment of the valve to the respective operational conditions, it can act on the plug in the direction of the closing spring, whereby a part of the spring force or the full spring force is applied through the transfer device. In other cases it is simpler to have the lift-off device act on the side of the plug opposite the closing spring. The transfer device then acts against the closing spring onto the plug and counters a part of the spring force of the closing spring until the resulting spring force on the plug has the desired, and for the respective number of revolutions of the compressor, the needed value.

The closing springs in the known compressor consist mainly of helical springs of steel or of steel plates with springy arms bent out from the plate surface. The forces acting on the lift-off grips also are often transmitted by such steel springs. As in the known valves, it is also possible within the framework of the invention to provide permanent or electric magnets, hydraulic or pneumatic cylinders or any combination thereof in order to obtain the required forces.

The invention will now be better understood by reference to the accompanying drawings, taken in conjunction with the following discussion.

DETAILED DESCRIPTION OF THE PREFERRED EMBODIMENTS

Figure 1:
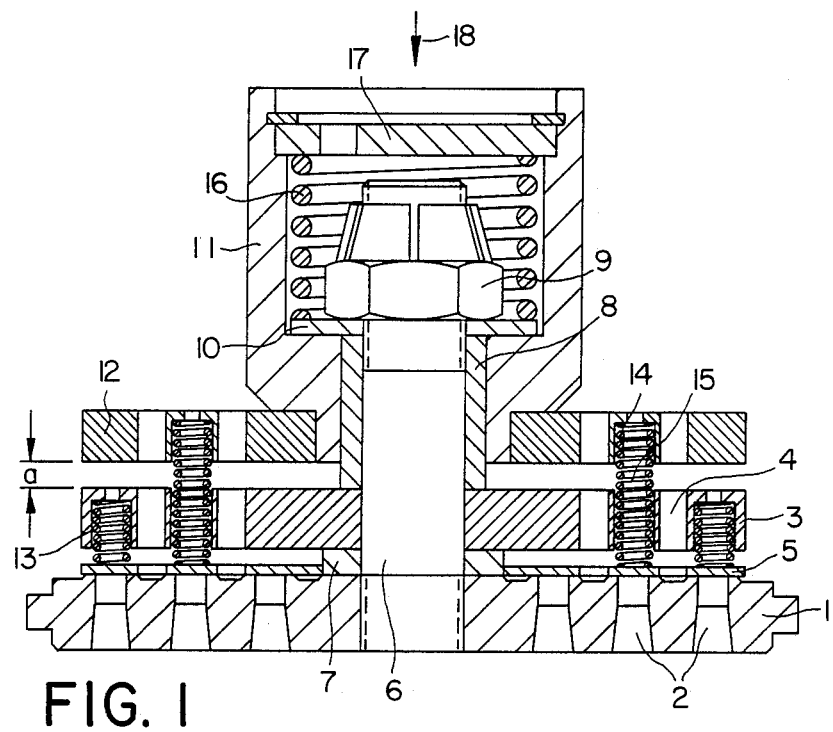
FIG. 1 shows a cross-sectional view of a first embodiment of compressor valve constructed according to the present invention.

In all the embodiments the condenser valve consists of a valve seat 1 with flow channels 2 and a catch 3 with connecting channels 4. Between the valve seat 1 and the catch 3 a plug 5 is arranged, which controls the flow channels 2 in the valve seat 1. When opening the valve, the plug 5 lifts off the valve seat 1 and impacts on the catch 3, which forms the lift stop. During this lift motion, the plug 5 is led in the valve and impacted by spring forces which are exerted in different ways in the individual embodiments. The lift motion of the plug 5 occurs under the effect of these spring forces and of current forces which are exerted by the medium which flows through the valve. In all the embodiments the valve seat 1 and the catch 3 are held together by a center screw 6 arranged in the valve axis, whereby some valve parts can be shifted against each other by a distance designated by a.

In FIG. 1 a valve is shown in which the valve seat 1 and the catch 3 are clamped together at a fixed distance by means of a lift shim 7 with the aid of a clamping sleeve 8, which is also clamped by the nut 9 of the center screw 6 via a shim disc 10 against the catch 3. The center screw 6, together with the clamping sleeve 8, forms a guide bolt on which a box 11 is shiftably mounted, carrying a spring plate 12 arranged above the catch 3. The plug 5 is acted on by closing springs 13 arranged in the catch 3. In addition, closing springs 14 are provided which are braced against the spring plate 12 through openings 15 in the catch 3. The shiftably mounted box 11 is acted on by a pull-back spring 16 in the direction away from the catch 3, which is braced with one end against the shim 10 and with its other end against a lid 17 closing off the box 11.

In the position shown in FIG. 1, the flow channels 2 of the valve seat 1 are closed off by the plug 5. The box 11 with the spring plate 12 is not acted on and held by the pull-back spring 16 in its upper end position in which a protrusion of the box 11 rests against the shim 10. The closing springs 14 are largely balanced so that the plug 5 is only acted on by the closing springs 13. The force of the closing springs 13 can be selected by taking into account the remaining spring force of the balanced closing springs 14, so that the total spring force acting in this position on the plug 5 is sized for the smallest number of revolutions of the compressor used and for a low specific weight of the compressed gas.

If the number of revolutions or the specific weight of the gas increases, an increase in the spring force is also needed. A regulating force is thus exerted onto the box 11 for this purpose in the direction of the arrow 18 by a suitable means. By this means the box is shifted together with the spring plate 12 against the force of the pull-back spring 16, whereby the distance a to the catch 3 is reduced in dependence on the size of the regulating force. This regulating motion has the effect that the closing springs are tensed, whereby the spring force on the plug 5 is increased. Thus, it is possible, by adjusting and changing the regulating force acting in the direction of the arrow 18, to adapt the total resulting spring force acting on the plug 5 according to the respective operating conditions of the compressor.

The design according to FIG. 1 is particularly suitable for a pressure valve. The valve seat 1 is clamped in the usual manner into the cylinder head, whereby the valve seat 1 faces the cylinder of the compressor and the box 11 points towards the outside so that the regulating force can be applied in the direction of the arrow 18. On the other hand, the model according to FIG. 2 is suitable for a suction valve in which the catch 3 is arranged between the valve seat 1 and the cylinder of the compressor.

Figure 2:
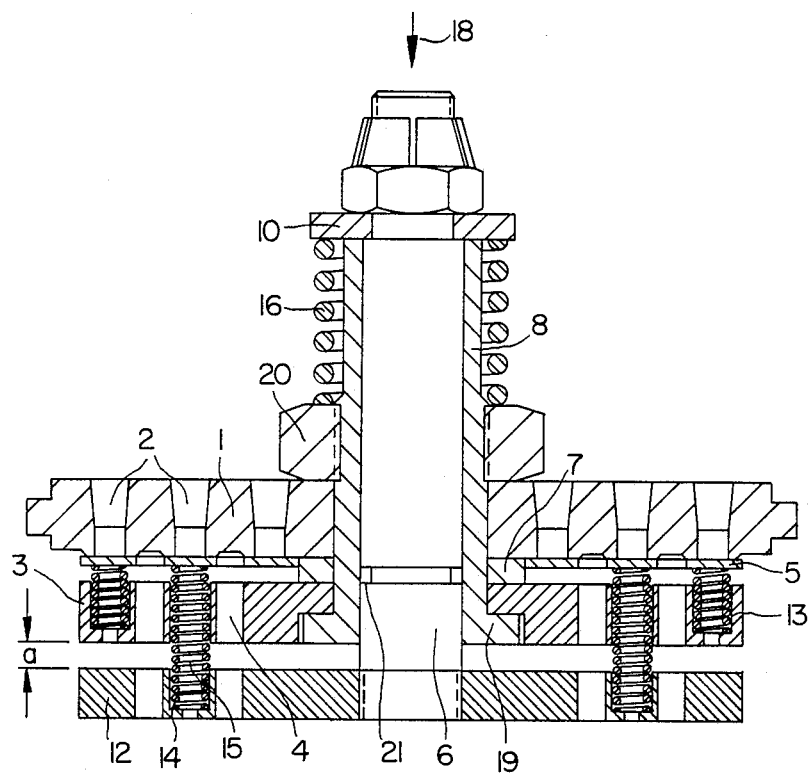
FIG. 2 shows a cross-sectional view of a second embodiment of compressor valve constructed according to the present invention.

In the embodiment according to FIG. 2, the clamping sleeve 8 is provided with a band 19 and a nut 20. In this manner, the catch 3 is clamped via the lift shim 7 against the valve seat 1. The spring plate 12 is attached to the lower end of the center screw 6 which, together with the shim 10, is shiftable against the force of the pull-back spring 16. An O-ring 21 seals the center screw 6 against the clamping sleeve 8. By means of a regulating force acting in the direction of the arrow 18 onto the center screw 6 by suitable means, the spring plate 12 can be adjusted by the distance a by means of which a change and adjustment of ths spring force acting on the plug 5 is possible.

Figure 3:
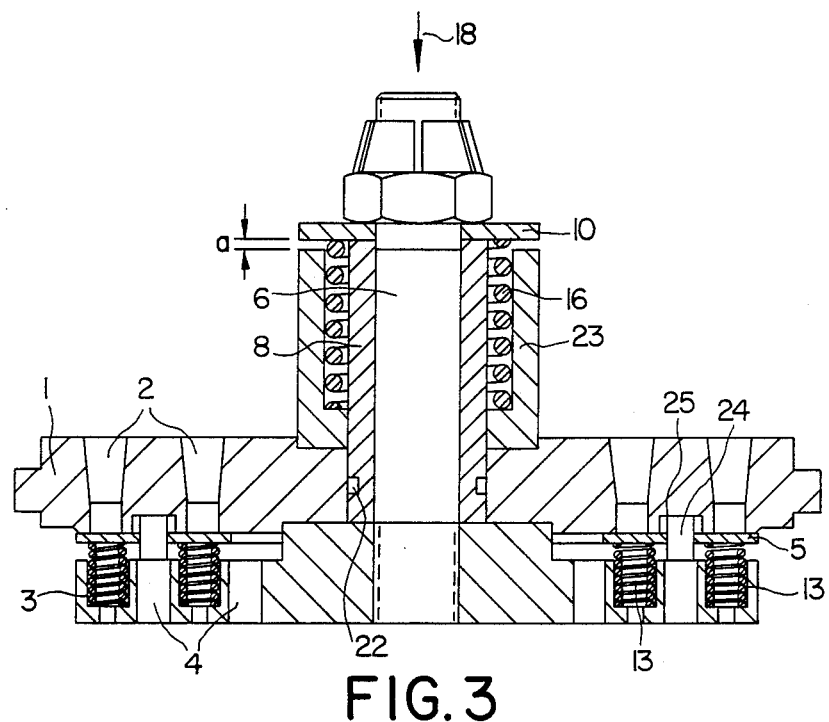
FIG. 3 shows a cross-sectional view of a third embodiment of compressor valve constructed according to the present invention.

FIG. 3 shows a variation without a shiftable spring plate in which the valve seat 1 and the catch 3 are arranged in a shiftable manner. The catch 3 is firmly connected to the center screw 6 and surrounded by the clamping sleeve 8 which is left shiftably in a central boring of the valve seat 1. An O-ring 22 is provided for sealing. The pull-back spring 16 is surrounded by a distance sleeve 23 which forms one end stop for the shim 10.

By applying a regulating force on the center screw 6 in the direction of the arrow 18, the catch 3 is shifted downwardly aginst the force of the pull-back spring 16 until the shim 10 impacts the distance sleeve 23. The distance a indicates the maximum possible adjustment distance. The plug 5, which in this embodiment consists of individual rings separated from each other, is led during the lift motion on protrusions 24 of the catch 3 protruding towards the valve seat. In order to prevent the guidance from being impaired or lost with the largest possible lift of the plug 5, the protrusions 24 reach into the groove 25 in the valve seat 1, and this by a distance which is at least as great as distance a by which the catch 3 can be adjusted against the valve seat 1.

Figure 4:
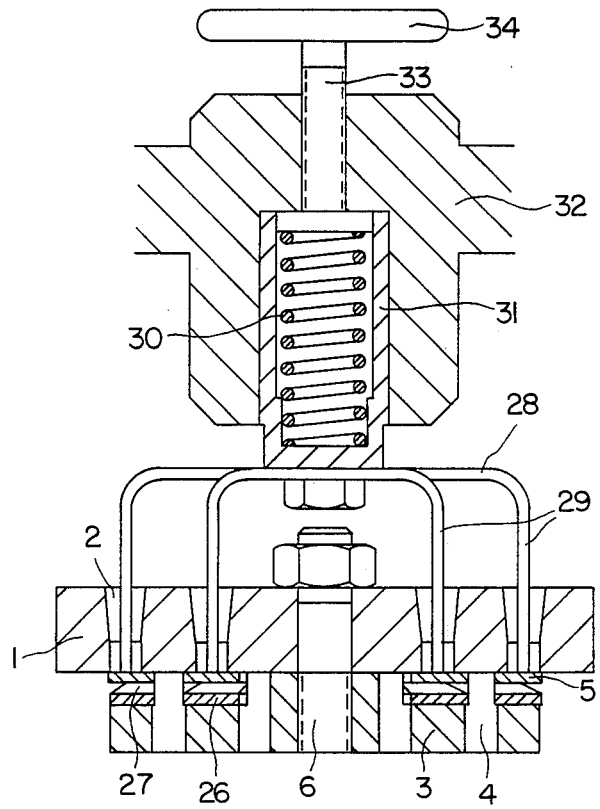
FIG. 4 shows a cross-sectional view of a fourth embodiment of compressor valve constructed according to the present invention.

In FIG. 4 another variation of the compressor valve according to the invention is shown. The plug 5, shaped as sealing disk, is charged there by a spring plate 26 with flexible spring arms 27, bent in the direction of the plug 5. A transfer device 28 with fingers 29 acts on the plug 5 through the connecting channels 2 of the valve seat 1. A regulating spring 30 presses the transfer device 28 against the plug 5 and this counteracts the closing force exerted by the spring plate 26. The regulating spring 30 is arranged in a piston-like sleeve 31 which is shiftably led in a housing 32. The regulating spring 30 can be tensed by means of a spindle 33 which is screwed into the housing 32 and can be operated by a hand wheel 34.

It is thus possible in this embodiment to adjust and change the total spring force acting on the plug 5 by adjusting the tension of the regulating spring 30 by means of the hand wheel 34. However, the force exerted by the regulating spring 30 may not exceed the closing force exerted by the spring plate 26. The force of the regulating spring 30 has to be calculated such that a spring force acting on the plug 5 in the closing direction always prevails. Otherwise, the plug 5 would be kept open permanently or at least at times by the transfer device 28 and thus an unaffected operation of the valve would be impeded. By applying a larger regulating force with the aid of the transfer device 28, no adaptation to the valve spring action to the varying number of revolutions of the compressor, but rather a regulation of the the transport amount with constant number of revolutions of the compressor, as it is actually known.

It should be noted that the invention also contemplates a process to adapt a compressor valve to varying operational conditions of the compressor by changing the total affecting closing spring force be executed with the aid of a lift-off regulating device which is actually already known for the regulation of the transport amount in condensers with constant number of revolutions. The lift-off grip serves there as a transfer device. For the process according to the invention it is, however, necessary to charge the lift-off grip with another regulating force as is the case in the known lift-off regulator of the transport amount.

Figure 5:
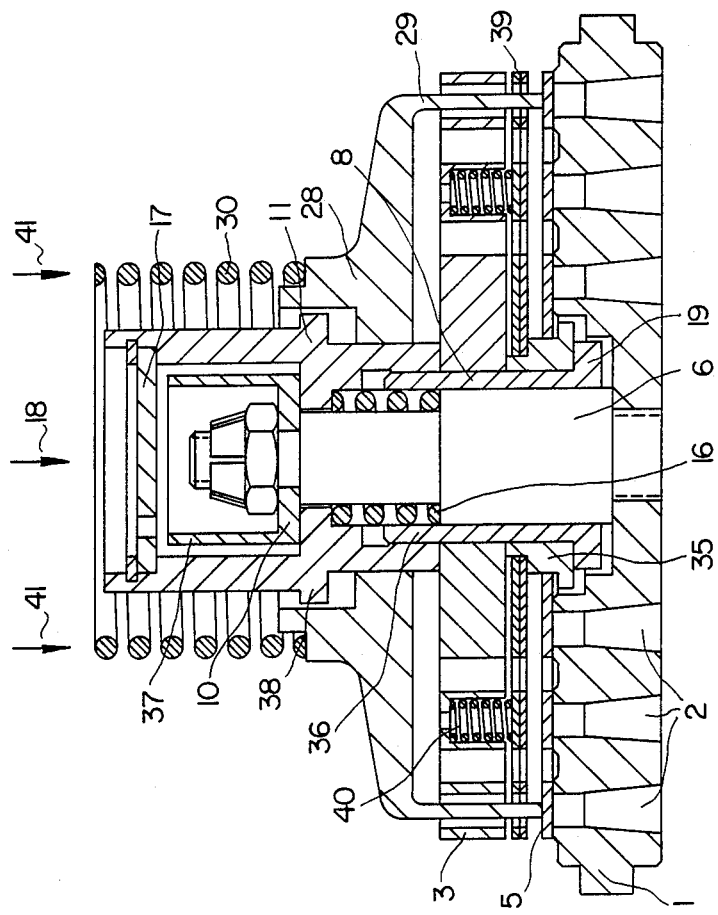
FIG. 5 shows a cross-sectional view of a fifth embodiment of compressor valve constructed according to the present invention.

In the compressor valve according to FIG. 5, a device for the adjustment of the valve lift is combined with a transfer device for changing the spring force. The center screw 6 is attached in the valve seat 1 which is clamped into the compressor as fixed component of the valve in a not shown manner. The clamping sleeve 8 has, similar to the embodiment in FIG. 2, a band 19 which clamps a graduated guide ring 35 against the catch 3. For this purpose, the box 11 is provided with a screw thread 36 and screwed to the end of the clamping sleeve 8. By means of a regulating force acting in the direction of the arrow 18, it is thus possible to shift the catch 3 against the force of the pull-back spring 16 against the valve seat 1. A pulled up rim 37 on the shim 10 serves as end stop for the lid 17 of the box 11.

On other outer jacket of the box 11, a transfer device 28 is led in a shiftable manner which is pressed via its finger 29 against the plug 5. A collar 38, protruding outwardly, serves as an end stop for the transfer device 28 in one direction. The force transferred from the transfer device 28 to the plug acts in this embodiment in the closing direction of the plug 5, so that no other closing springs are needed. However, in front of the catch 3 two damper plates 39 are arranged wich are charged by the damper springs 40 and held at a fixed distance from the catch 3 by a protrusion of the guide ring 35. When the catch 3 is shifted, neither the lift of the damper plates 39 nor the force exerted by the damper springs 40 changes. However, the valve constructions can also be designed such that the lift of the damper plates and/or the spring force acting on them can be adjusted in the same manner as on the sealing plate.

In the embodiment according to FIG. 5, the compressor valve can be adapted to varying operational conditions of the compressor in two different ways in the sense of the process according to the invention. By a force acting in the direction of the arrow 18 on the box 11, the lift of the compressor valve can be adjusted and by a force acting in the direction of the arrow 41 on the regulating spring 30, the closing force acting on the plug 5 can be adjusted through the transfer device 28. It is thus possible, by the application of either of the two measures or by the simultaneous application of both measures, to adapt the valve to varying numbers of revolution of the compressor and/or to a varying specific weight of the transported gas, whereby a continuous adjustment as well as an adjustment by individual steps is possible. Depending on the respective type of use, the described embodiments and their constructive characteristics can be combined at will. It is also possible to replace the helical steel springs shown by pneumatic or magnetic spring forces. The regulating forces also may be applied, depending on the circumstances, by pneumatic, hydraulic or electromagnetic means.

It is claimed:

1. A compressor valve for a compressor through which a gaseous medium flows, said compressor valve comprising a valve seat having opposite first and second sides and flow channels which extend therethrough from said first side to said second side, flow of gaseous medium passing through said flow channels from said first side of said valve seat to said second side, a catch which is positioned in register with one of said first and second sides of said valve seat and is adjustably spaced therefrom, said catch including connecting channels therein, a plug means positioned between said catch and said valve seat, said plug means being movable against said valve seat to block the flow channels therein or movable away from said valve seat to unblock said flow channels therein, and spring means extending between said catch and said plug means to bias said plug means against said valve seat to block said flow channels, the positioning of said catch relative to said valve seat determining the total spring force pushing said plug means against said valve seat to thus accommodate the rotational speed of the compressor to which the compressor valve is attached and the specific weight of the gaseous medium passing therethrough.

2. A compressor valve according to claim 1, wherein said connecting channels in said catch are offset relative to said flow channels in said valve seat.

3. A compressor valve according to claim 1, wherein said plug means comprises a plurality of separate rings, and wherein said spring means comprises a plurality of helical springs which are annularly arranged to bias each of said plurality of rings against said valve seat.

4. A compressor valve according to claim 3, wherein said catch includes a plurality of protrusions which are arranged in at least one annular row and which extend towards said valve seat, each annular row of protrusions extending between two of said plurality of rings.

5. A compressor valve according to claim 1, including a center screw which extends through said valve seat and connects with said catch.

6. A compressor valve according to claim 5, including a sleeve positioned around said center screw so as to extend through said valve seat and abut at a first end thereof against said catch, a distance sleeve positioned around said sleeve so as to abut at a first end thereof against said valve seat, a shim positioned around said center screw so as to abut against a second end of said sleeve and be abuttable against a second end of said distance sleeve, a nut attached to said center screw to limit the movement of said shim along said center screw away from said catch, and a pull-back spring mounted between said distance sleeve and said shim to bias said distance sleeve away from said shim and thus bias said catch towards said valve seat.

* * * * *

UNITED STATES PATENT AND TRADEMARK OFFICE
CERTIFICATE OF CORRECTION

PATENT NO. : 4,869,289

DATED : September 26, 1989

INVENTOR(S) : Hans Hrabal

It is certified that error appears in the above-identified patent and that said Letters Patent is hereby corrected as shown below:

On the title page, item [30] Foreign Application Priority Data

April 16, 1986    Austria .........994/86

Signed and Sealed this

Fourteenth Day of August, 1990

Attest:

HARRY F. MANBECK, JR.

*Attesting Officer*        *Commissioner of Patents and Trademarks*